United States Patent [19]

Barrett, Jr. et al.

[11] 4,014,020

[45] Mar. 22, 1977

[54] AUTOMATIC GAIN CONTROL CIRCUIT FOR HIGH RANGE RESOLUTION CORRELATION RADAR

[75] Inventors: Carl R. Barrett, Jr., Hazelwood, Mo.; Abe Goldstein, Santa Ana, Calif.

[73] Assignee: The United States of America as represented by the Secretary of the Navy, Washington, D.C.

[22] Filed: Aug. 13, 1971

[21] Appl. No.: 174,577

[52] U.S. Cl. .............................. 343/7 AG; 343/7.4
[51] Int. Cl.² .......................................... G01S 7/02
[58] Field of Search .......... 325/404, 405; 343/5 R, 343/7 A, 7.4, 7 AG

[56] References Cited

UNITED STATES PATENTS

| | | | |
|---|---|---|---|
| 3,454,882 | 7/1969 | Miller | 325/405 |
| 3,588,894 | 6/1971 | Prickett | 343/5 R |

Primary Examiner—T.H. Tubbesing
Attorney, Agent, or Firm—R. S. Sciascia; G. J. Rubens

[57] ABSTRACT

Automatic gain control circuitry for high range resolution correlation radar systems used with passive-active missile seeker weapons to provide RF and IF gain control, acceptable angle track nutation signals, AGC video delay for low frequency signal variations, and minimum AGC response time compatible with system stability. AGC processing is initiated when the acquisition or active track mode is selected, if video presence exists as an output from a video presence integrator. Likewise active mode automatic angle tracking is interfaced through the AGC circuit and is inhibited when the received target amplitude is less than a selectively predetermined AGC amplitude delay.

2 Claims, 3 Drawing Figures

AUTOMATIC GAIN CONTROL CIRCUIT FOR HIGH RANGE RESOLUTION CORRELATION RADAR

CROSS REFERENCES TO RELATED APPLICATIONS

This case is closely related to the following copending patent applications which are hereby incorporated by reference:
 a. "A Passive Active Missile Seeker System," Ser. No. 174,576 filed on Aug. 13, 1971 by Goldstein et al; now abandoned;
 b. "Digital Range Tracking Apparatus for High-Range Resolution Correlation Radars," Ser. No. 173,336 filed on Aug. 13, 1971 by Goldstein et al, now abandoned;
 c. "High-Range Resolution Radar Real Time Display Apparatus," Ser. No. 170,688 filed on Aug. 13, 1971 by Goldstein et al, now U.S. Pat. No. 3,735,411.

BACKGROUND OF THE INVENTION

The active system of a passive-active missile system recently developed by the Navy basically comprises an automatic tracking radar which uses state-of-the-art techniques for target detection and identification and which is described in the above referenced related applications.

In operation, as discussed in the above patent applications, the active system transmits a linear FM waveform which is processed in a high range resolution receiver to yield an active filtering form of pulse compression. A parallel receiver process is used to maintain data rate while generating an analog output form of range tracking obtained by means of sequential lobing (conical) error generation techniques. Automatic gain control is provided to normalize target amplitudes to selectively predetermined levels for highly accurate range and angle tracking and also to assure that all portions of the active receiver operate without saturation when responding to predicted target configurations. Furthermore, automatic gain control is necessary to maintain linear receiver response in a system requiring large dynamic ranges and radio frequency preamplification.

SUMMARY OF THE INVENTION

Automatic gain control circuitry for high range resolution correlation radars of the type used with passive-active missile seeker weapons systems is disclosed. The AGC circuitry provides RF and IF gain control, acceptable angle track nutation signals and minimizes AGC response time compatible with system stability. AGC processing is initiated when the acquisition or active mode is selected if video presence exists as an output from a video presence integrator. Similarly active mode automatic angle tracking is interfaced through the AGC circuitry and is inhibited when the received target amplitude is less than a selectively predetermined AGC delay value. In addition the AGC circuitry also accepts angle error nutation signals from the target, sampled-and-held video and after scaling the signals, couples them to angle error demodulators which generate angle tracking errors which are fed to a servo system.

OBJECTS OF THE INVENTION

It is a primary object of the present unique invention to provide an automatic gain control circuit for high range resolution correlation radars used with passive-active missile seeker weapons to provide gain reduction on both the IF and RF portions of active mode receivers.

It is another object of the present invention to provide an AGC circuit to maintain linear receiver response in high range resolution radars which require large dynamic ranges and radio frequency preamplification.

It is another further object of the novel invention to provide an AGC circuit to maintain linear active receiver response in a passiveactive missile seeker system which receives range information in a frequency multiplex format.

It is still a further object of the present invention to provide an AGC circuit which can provide acceptable angle track nutation signals.

It is a final object of the present invention to provide an AGC control circuit for a passive-active missile seeker which can operate with proportional control whereby all receiver stages are maintained in their linear ranges.

Other objects, advantages and novel features of the invention will become apparent from the following detailed description of the invention when considered in conjunction with the accompanying drawings.

DESCRIPTION OF THE PREFERRED EMBODIMENT

The novel automatic gain control circuit to be disclosed herein is intended for use primarily, but not exclusively, with a high range resolution correlation radar of the type disclosed in our copending patent application, previously mentioned, entitled "Passive-Active Missile Seeker."

Figure 1:
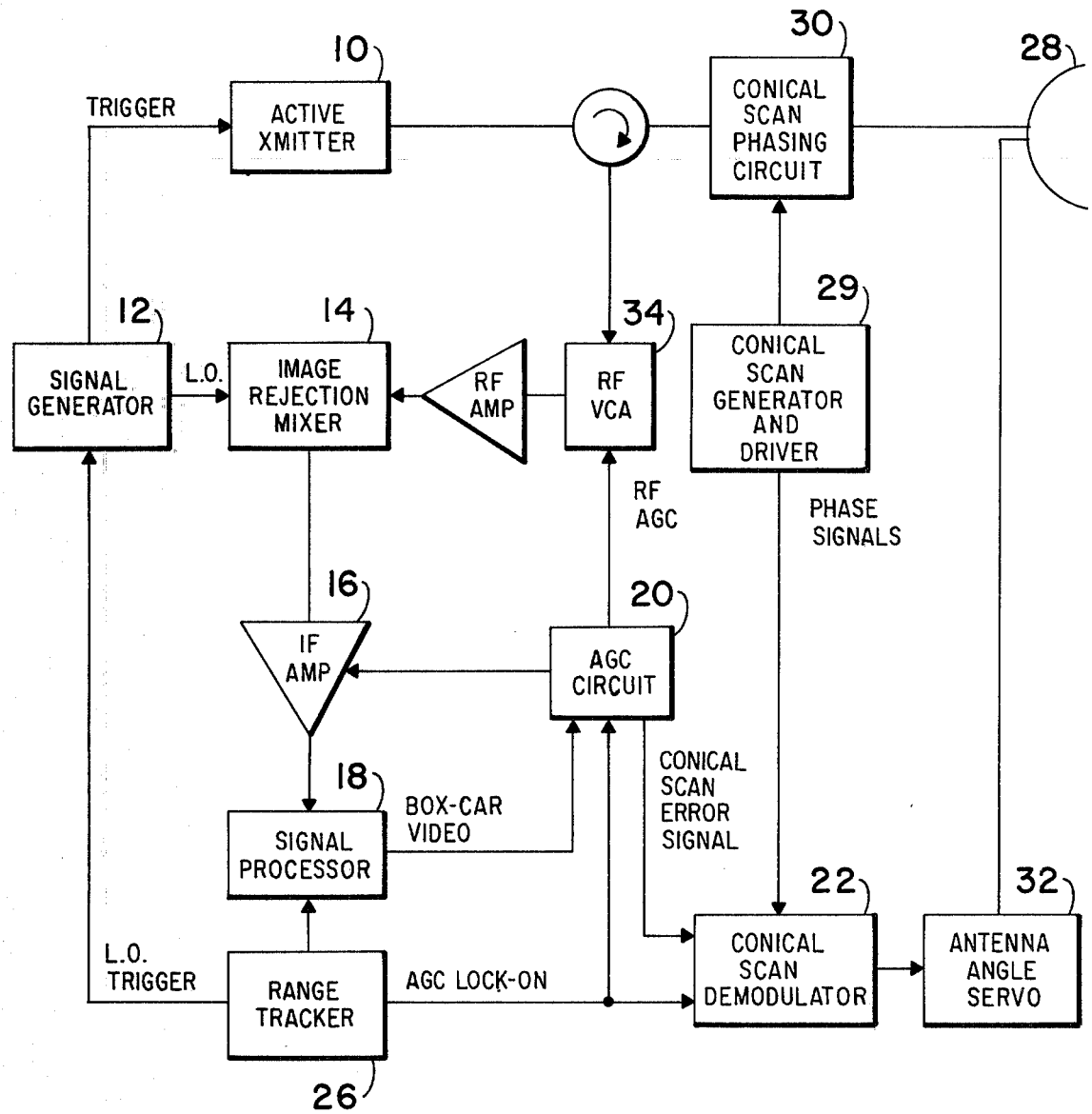
FIG. 1 is a simplified schematic diagram of a high range resolution correlation radar of a passive-active missile seeker system incorporating the novel AGC circuit to be disclosed herein.
Figure 3:
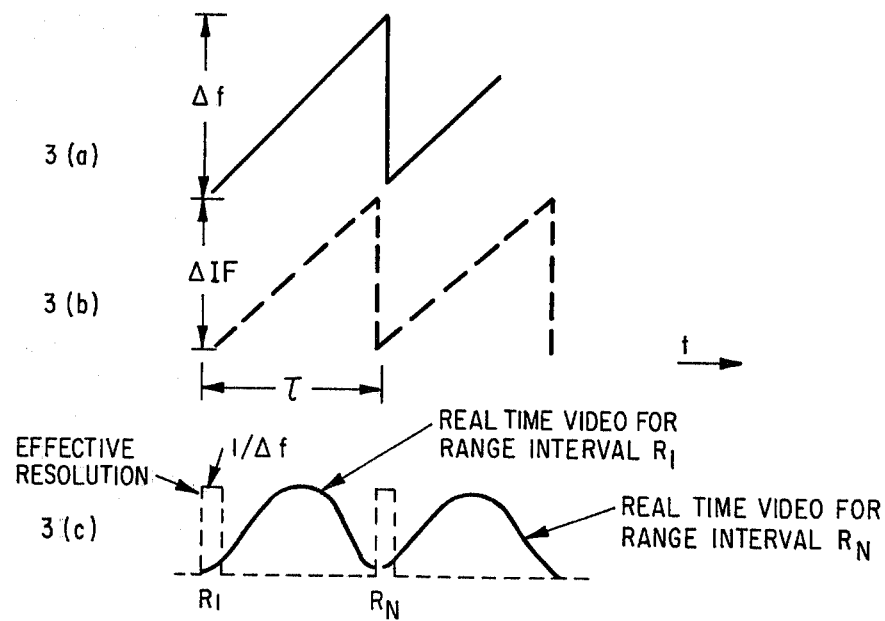
FIG. 3 is a graphical representation of typical waveforms associated with the circuitry shown in FIG. 1.

Briefly, the radar, shown in FIG. 1, functions to provide improved target designation and range resolution in an anti-missile weapon. In operation, the radar transmitter 10 generates a linear FM signal having a pulse width equal to $\tau$ and which is swept over the frequency band $\Delta f$ as shown in FIG. 3($a$). Simultaneously a signal generator 12 generates a corresponding L.O. signal which is shifted in frequency by an amount equal to the IF frequency, $\Delta$IF, of the radar as shown in FIG. 3($b$).The L.O. signal is likewise swept through the frequency band $\Delta f$ in the same time interval $\tau$, beginning at a selectively predetermined time delay.

The returned high range resolution signal is correlated in the image rejection mixer 14 whose output is fed through an IF amplifier 16 into the signal processor 18 which produces an angle-error video output which is coupled to the AGC circuit 20.

Figure 2:
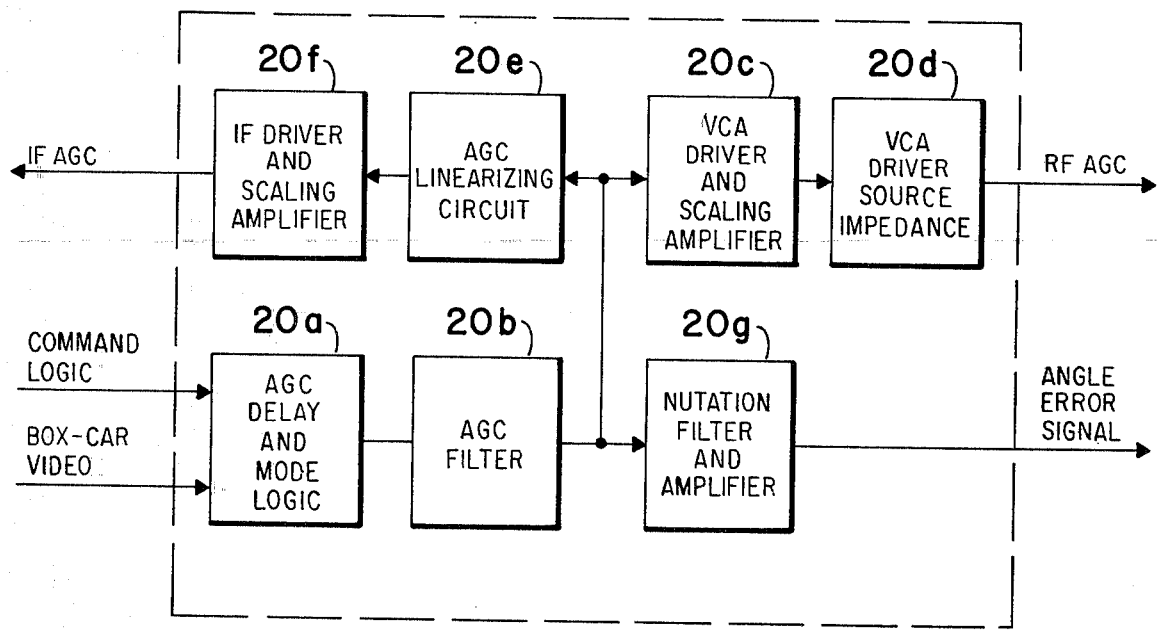
FIG. 2 is a simplified electrical schematic diagram of the novel AGC circuit to be disclosed herein and shown in FIG. 1.

As previously mentioned, the AGC circuit, shown in block diagram in FIG. 2, functions in the system of FIG. 1 to provide both RF and IF gain control, angle track nutation signals, AGC video delay for low frequency signal variations, and minimum AGC response time compatible with system stability. As shown in FIG. 2, the AGC circuit comprises an AGC delay and mode logic circuit 20a which can comprise a scaling amplifier, DC-offset generator, and driver. The circuit accepts a box-car video input signal from the signal processor 18 and multiplies it by a selectively predetermined gain, and produces a selectively predetermined delay. The circuit also receives a command logic (target gate) input from an antenna relay control circuit (not shown) to initiate AGC operation. The AGC circuit 20 can operate in either a manual or automatic mode. The command logic input is provided only when acquisition/tracking signals are being produced by the system.

The output of the AGC delay and mode logic 20a is coupled to a low-pass AGC filter 20b which can comprise a conventional lag network isolated by an emitter-follower from a lag-lead network.

The output of the AGC filter circuit 20b is fed to the VCA driver-scaling amplifier 20c, the AGC linearizing circuit 20e, and to the nutation filter and amplifier 20g.

The VCA driver and scaling amplifier, whose output is coupled to a VAC driver source impedance 20d, should have a gain and DC-offset such that approximately a constant resultant AGC open loop gain will be maintained regardless of the required gain control level.

The output from the AGC linearizing circuit is fed as an input to the IF driver and scaling amplifier 20f and to the nutation filter and amplifier 20g.

A radar target located at a range $R_1$ substantially equal to the start of the L.O. sweep will appear at the mixer 14 output at the IF frequency and will have its energy concentrated in a bandwidth, $1/\tau$, centered at the IF frequency $\Delta IF$ as shown in FIG. 3(c).

The detected video output will have a width substantially equal to $\tau$, although the effective resolution or pulse width will be equal to $1/\Delta f$ since the L.O. sweep occurring $1/\Delta f$ seconds later will produce a mixer output from a target $R_1$ which is not within the IF passband as shown in FIG. 3(c).

Conversely, if a target were located at a range equal to $1/\Delta f \times C/2$ feet closer or further in range (where C is the speed of light), and if the L.O. sweep were constant, the same target rejection would occur. Thus, if it is desired to examine range cells spaced by $1/\Delta f$ between the ranges $R_1$ and $R_n$, the L.O. sweep must be started $1/\Delta f$ seconds later each successive PRF or alternatively, the signal processor 18 must comprise N-IF filters 18 spaced in frequency by $1/\Delta f$ with respect to each other in a manner to be described hereinafter with reference to the circuit of FIG. 1 which incorporates both techniques to obtain an optimization of data rate, data continuity, and system complexity.

As previously mentioned, the AGC circuit 20 will be energized when a radar target has been identified (using conical scan techniques) as being appropriate for high resolution processing, and furthermore the target has been placed within appropriate tracking gates in preparation for automatic gain control processing whereby a command logic signal is applied to the circuit 20 indicating that tracking/acquisition has begun. When this occurs, angle tracking pattern nutation is initiated with antenna pointing errors provided to the antenna angle servo system 32 as an output from the conical scan demodulator 22. That is, the demodulator 22 is responsive to the box-car video output from the AGC circuit 20 when mutually orthogonal phased signals from its conical scan (nutation) generator and driver 29 are used as phase references.

As shown in FIG. 3(c), the video representing a range cell $R_n$ has a duration approximately equal to $1/\tau$ and is defined in range by both the delay time from the start of the linear FM transmitted sweep to the start of the linear FM L.O. sweep and its position within the N-parallel narrowband filters in the signal processor 18. Thus, if the video from one of the narrowband channels is processed in a sample-and-hold circuit in the signal processor at a selectively predetermined delay time after the start of the L.O. sweep, a box-car video signal having a level proportional to the received energy at the defined target range will result. The delay time is selected to be substantially equal to the IF propagation delay plus one-half the transmitted pulse length.

When this signal is applied to the AGC circuit 20, gain control response may be initiated; however, for most target configurations it is desirable to initiate gain control upon the largest target amplitude which exists within a limited extent about the defined target range. This can be accomplished by dividing the N-parallel filter channels in the signal processor 18 into two equal groups. One group of N/2 contiguous filter channels will represent early target ranges and the remaining N/2 filter channels will represent late target ranges.

Since the range tracker 26 is defined in this manner and since range tracking errors are generated about the center of the range sample, the N-parallel channels do provide limited extent data about the defined target range. To use the limited extent data, the outputs from the N-parallel channels are peak detected in peak detector circuits and then applied as a single video output to appropriate sample-and-hold circuitry to produce the box-car video fed to the AGC circuit.

As previously mentioned, RF preamplification is necessary for optimum performance of the correlation radar. This requirement can be appreciated by recalling that a linear FM spectra is used as the L.O. signal in the receiver image rejection mixer 14. When the system is operated in a "search" mode, it is necessary to rapidly retrace the signal source across the frequency band $\Delta f$ so that data rate may be maintained for effective system operation.

Likewise, since it is impossible to provide a perfect impedance match in the L.O. circuit 12 across the desired frequency band, and since state-of-the-art sources capable of such stringent sweep requirements display significant amplitude variations versus frequency, amplitude modulation noise will appear at the output of the image rejection mixer 14 as an input to the IF receiver. Without appropriate RF preamplification such amplitude modulation noise can significantly increase the receiver noise figure above acceptable receiver sensitivity.

Similarly, RF attenuation is required in the system of FIG. 1 because state-of-the-art, low noise figure devices cannot directly handle the required receiver dynamic range due to their RF activation characteristics. Also, since RF attenuation can produce a degradation in the resultant noise figure, it is advantageous to initiate gain control in the receiver output stages.

After signal amplitudes are increased substantially above minimum discernable levels, limited RF gain control may be applied to the system of FIG. 1 without appreciable effect on resultant signal-to-noise ratios. By appropriate design control, signals of predictable amplitudes from isolated point targets may be held below saturation in all wideband, multiplexed receiver elements so that returns from specified target environments do not experience signal intermodulation in the wideband receiver elements.

In accordance with the present inventive concept, conical-scan beam nutation techniques are applied to the four-quadrant array antenna 28. A conical scan phasing circuit 30 is used to divide the transmitter energy into four equal elements having selectively predetermined phase relationships and to drive the four quadrants through analog phase shifter circuitry.

A conical-scan (nutation) generator and driver 29 drives the phasing circuitry 30 in such a manner that each of four phase shifters produces a different sinusoidal RF phase delay. In the preferred embodiment, each sinusoidal phase delay advances by 90° in a clockwise manner around the four quadrants. This technique produces a net "phase tilt" which nutates about the antenna plane and which is manifested in the resultant antenna phase front, and which "forces" the beam to electronically scan about the antenna boresight beam axis. Thus a target placed at a particular polar coordinate relative to the boresight axis will experience a signal fluctuation with amplitude and phase defined by its position within the nutated beam.

The antenna 28 is electrically reciprocal so that an additional signal modulation of similr phase and amplitude is introduced when it is operating as a receiving antenna. The received signal is removed at the output of the AGC filter 20b and fed through a nutation filter and amplifier 20g to the conical-scan demodulator 22 where it is compared with phase references from the nutation generator and driver 24 to derive servo-angle error commands which are fed to the antenna angle servo system 32.

To minimize AGC response time, the nutation error signal is extracted at the output of the low pass AGC filter 20b and before it is fed to the IF and RF scaling amplifier circuits 20f and 20c, respectively. This technique allows the AGC circuit to achieve maximum open loop gain and band width consistent with stability requirements in the sampled data system. In the same manner, large nutation fluctuations, which are possibly introduced on the received signal by target antenna beam position, are controlled by the AGC circuit 20 to prevent receiver saturation until such time as the angular errors are nulled to zero by the angular tracking circuitry.

It should be appreciated that the AGC circuit 20 provides gain control apportionment between the RF voltage controlled attenuator (VCA) 34 and the wideband IF amplifier 16. To maintain substantially optimum output signal-to-noise ratios, approximately 20db of gain control is applied to the wideband IF amplifier before initiating RF gain reduction. As the requirement for gain reduction increases, gain control is proportioned so that maximum gain reduction occurs simultaneously in both the RF and IF circuitry when maximum expected signal amplitudes occur and so that intermodulation and saturation effects do not occur for specific target configurations.

To arrive at the above tailored response, a diode linearizing circuit 20e is employed to force a decrease in slope of the gain reduction versus control voltage response of the wideband IF beginning at approximately 20db of gain reduction.

The VCA 34 is driven through a driver source impedance 20d which has a predetermined output impedance and open circuit gain so that its gain control action will begin when the IF amplifier experiences about 20db of gain reduction. Also the net result of the VCA and IF amplifier will be a gain control system which displays a linear control characteristic as required to maintain accurate angle tracking nutation error information and to meet the dynamic range considerations imposed on the receiver.

It should be appreciated that the different components of the AGC circuit can comprise conventional, well-known delay circuits, low-pass filters, drivers, etc., and that consequently these components need not be described in detail.

Thus it can be seen that a new and novel AGC circuit which is particularly useful with the active portion of a passive-active missile seeker weapon system has been disclosed. As range control is commanded by an operator, AGC is initiated. Since the video generated by the active radar system has narrow bandwidth characteristics, a gate is positioned to obtain a sample of the receiver output coincident with the range sample taken. This sampled amplitude is applied to a low-pass filter and AGC driver circuit.

RF attenuation is applied prior to an image rejection mixer due to noise figure considerations. Also, since this attenuation produces an increase in receiver noise figure, the attenuation level should be maintained near zero until the received signal strength has increased significantly above a selectively predetermined minimum detectable amplitude.

Afte the received amplitude has exceeded an acceptable level, any further gain control is accomplished by approximately proportional control on both the RF voltage control attenuator and the broadband IF receiver. This AGC proportional gain function is generated by a diode "linearizing" circuit which forces a selectively predetermined decrease in the IF gain control versus gain control voltage scale factor. This "knee" is positioned at about 20db of gain reduction.

Finally, by appropriately scaling the gains of amplifiers which drive the VCA and IF gain control buss, and by selecting the output impedance of the amplifier driving the VCA, an approximately linear net gain control characteristic is obtained for the active system operating range.

Obviously many modifications and variations of the present invention are possible in the light of the above teachings. It is therefore to be understood that within the scope of the appended claims the invention may be practiced otherwise than as specifically described.

What is claimed is:

1. In a high-range resolution, correlation radar system, active mode AGC circuitry comprising:
   input means for receiving target gate signals from said system to energize said AGC circuitry, and angle-error, box-car video signals from said system, said input means including delay means responsive to said video signals when received target amplitude is greater than a selectively predetermined delay;
   low-pass filter means connected to the output of said input means;

RF driver and scaling amplifier means connected to the output of said low-pass filter means to provide RF gain control signals at the output thereof;

linearizing circuit means connected to the output of said low-pass filter means;

IF driver and scaling amplifier means connected to the output of said linearizing circuit means to provide IF gain control signals at the output thereof and simultaneously with said RF gain control signals; and, nutation filter means connected to the output of said low-pass filter means for removing angle-error, nutation signals from said video signals.

2. In a high-range resolution correlation radar system, an active mode AGC circuit comprising:

input means for accepting command logic signals from range tracking apparatus in said radar system to initiate AGC operation if detected video signals from said radar system are present at the input of said input means;

diode, linearizing circuit means connected to the output of said input means;

IF amplifier means connected to the output of said linearizing circuit means for producing IF gain control;

RF amplifier means connected to the output of said input means for producing RF gain control;

and means connected to the outputs of said input means and said linearizing means for producing angle-error nutation signals.

* * * * *